United States Patent
Sakata et al.

(10) Patent No.: US 8,017,034 B2
(45) Date of Patent: Sep. 13, 2011

(54) POLYAMIDE COMPOSITION

(75) Inventors: Norio Sakata, Tokyo (JP); Hiroshi Oyamada, Tokyo (JP); Masaaki Aramaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 64 days.

(21) Appl. No.: 12/307,134

(22) PCT Filed: Jul. 18, 2006

(86) PCT No.: PCT/JP2006/314154
§ 371 (c)(1),
(2), (4) Date: Dec. 31, 2008

(87) PCT Pub. No.: WO2008/010259
PCT Pub. Date: Jan. 24, 2008

(65) Prior Publication Data
US 2009/0302272 A1 Dec. 10, 2009

(51) Int. Cl.
C09K 19/06 (2006.01)
C09K 19/52 (2006.01)
C09K 19/00 (2006.01)

(52) U.S. Cl. ............... 252/299.01; 252/299.6; 428/1.1; 430/20; 430/270.1

(58) Field of Classification Search .......... 252/299.01, 252/299.6; 430/270.1, 20; 428/1.1
See application file for complete search history.

(56) References Cited

FOREIGN PATENT DOCUMENTS

| EP | 0 169 947 A1 | 2/1986 |
|---|---|---|
| JP | H05-032870 A | 2/1993 |
| JP | 06-041400 | 2/1994 |
| JP | 2000-103867 A | 4/2000 |
| JP | 2000-109687 | 4/2000 |
| JP | 2002-241510 | 8/2002 |
| JP | 2006-008964 A | 1/2006 |
| JP | 2006-199789 | 8/2006 |
| WO | 2005/116141 A1 | 12/2005 |

OTHER PUBLICATIONS

Supplemental European Search Report issued in relation to European Application No. 067811752.2 and dated Jun. 21, 2011.

*Primary Examiner* — Geraldina Visconti
(74) *Attorney, Agent, or Firm* — Greenblum & Bernstein, PLC

(57) ABSTRACT

The present invention can provide a polyamide composition that is more excellent in the heat resistance and tensile elongation of molded products and also more excellent in a balance between these properties than those given by conventional polyamide compositions. The present invention relates to a polyamide composition comprising polyamide, liquid-crystalline polyester, and non-liquid-crystalline polyester, characterized in that Ma part by mass of the polyamide, Mb part by mass of the liquid-crystalline polyester, and Mc part by mass of the non-liquid-crystalline polyester with respect to 100 parts by mass in total of the polyamide, the liquid-crystalline polyester, and the non-liquid-crystalline polyester satisfy the following formulas: $60 \leq Ma \leq 90$, $2 \leq Mb \leq 38$, and $2 \leq Mc \leq Ma \times 0.2 - 2$.

8 Claims, 1 Drawing Sheet

"●" represents Examples. "▲" represents Comparative Examples.

①  represents the Numbers of Examples or Comparative Examples.

POLYAMIDE COMPOSITION

TECHNICAL FIELD

The present invention relates to a polyamide composition that is excellent in a balance among tensile properties, heat resistance, and water absorbency.

BACKGROUND ART

The preparation of a resin composition by mixing polyamide with a liquid-crystalline polymer has heretofore been proposed for the purpose of improving or enhancing the heat resistance and mechanical properties of polyamide. For example, Patent Document 1 discloses a resin composition comprising a liquid-crystalline polymer and semi-aromatic polyamide. Moreover, Patent Document 2 discloses a resin composition comprising liquid-crystalline polyester, non-liquid-crystalline polyester, and non-liquid-crystalline polyamide. Moreover, Patent Document 3 discloses a resin composition comprising polyamide, a liquid-crystalline polymer, thermoplastic polyester, and red phosphorus.

However, according to the study of the present inventors, the composition described in Patent Document 1 has excellent heat resistance but low tensile properties. Moreover, the composition described in Patent Document 2 has poor extrudability at the content of each polymer within the range described therein and is therefore unpractical. Furthermore, the composition described in Patent Document 3 has less-than-excellent heat resistance and low tensile properties due to a small amount of the liquid-crystalline polymer formulated.

Patent Document 1: Japanese Patent Application Laid-Open No. 5-32870
Patent Document 2: Japanese Patent Application Laid-Open No. 2000-103867
Patent Document 3: Japanese Patent Application Laid-Open No. 2000-109687

DISCLOSURE OF THE INVENTION

Problems to be Solved by the Invention

An object of the present invention is to obtain a polyamide composition that exhibits favorable tensile elongation, water absorbency, and heat resistance and is also excellent in a balance among these physical properties.

Means for Solving the Problems

The present inventors have conducted diligent studies for achieving the object of the present invention and have consequently found that the object is achieved by a resin composition obtained by melt-kneading particular amounts of liquid-crystalline polyester and non-liquid-crystalline polyester with respect to polyamide.

Specifically, the present invention provides:

(1) a polyamide composition comprising a polyamide (A), a liquid-crystalline polyester (B), and a non-liquid-crystalline polyester (C), wherein parts by mass (Ma) of the polyamide (A), parts by mass (Mb) of the liquid-crystalline polyester (B), and parts by mass (Mc) of the non-liquid-crystalline polyester (C), in case that total of the polyamide (A), the liquid-crystalline polyester (B), and the non-liquid-crystalline polyester (C) is 100 parts by mass, satisfy the following formulas:

$60 \leq Ma \leq 90$, $1.2 \leq Mb \leq 38$, and $2 \leq Mc \leq Ma \times 0.2 - 2$;

(2) the polyamide composition according to (1), wherein a ratio between the parts by mass (Mb) of the liquid-crystalline polyester (B) and the parts by mass (Mc) of the non-liquid-crystalline polyester (C) satisfies the following formula:

$1 \leq Mb/Mc \leq 7$;

(3) the polyamide composition according to (1) or (2), wherein the liquid-crystalline polyester (B) has a melting point (Tmb) from 210° C. to 350° C.;

(4) the polyamide composition according to any one of (1) to (3), wherein the non-liquid-crystalline polyester (C) is selected from at least one or more of polyethylene terephthalate, polytrimethylene terephthalate, and polybutylene terephthalate;

(5) the polyamide composition according to any one of (1) to (4), wherein the polyamide (A) is polyamide 6, polyamide 66, polyamide 612, polyamide 6I, polyamide 6C, or a polyamide copolymer containing two or more of monomeric units of these polymers, or a mixture of these polymers and/or polyamide copolymers;

(6) the polyamide composition according to any one of (1) to (5), wherein the parts by mass (Ma) of the polyamide (A) satisfy the following formula:

$70 \leq Ma \leq 88$;

(7) the polyamide composition according to (6), wherein the parts by mass (Mb) of the liquid-crystalline polyester (B) satisfy the following formula:

$5 \leq Mb \leq 20$; and (8) the polyamide composition according to any one of (1) to (7), wherein the parts by mass (Mc) of the non-liquid-crystalline polyester (C) satisfy the following formula:

$2 \leq Mc \leq 10$.

Effect of the Invention

The present invention provides a polyamide composition that is suitable as various industrial materials such as machinery parts and electrical/electronic parts and is excellent in a balance among the physical properties of tensile elongation, water absorbency, and heat resistance.

BEST MODE FOR CARRYING OUT THE INVENTION

Figure 1:
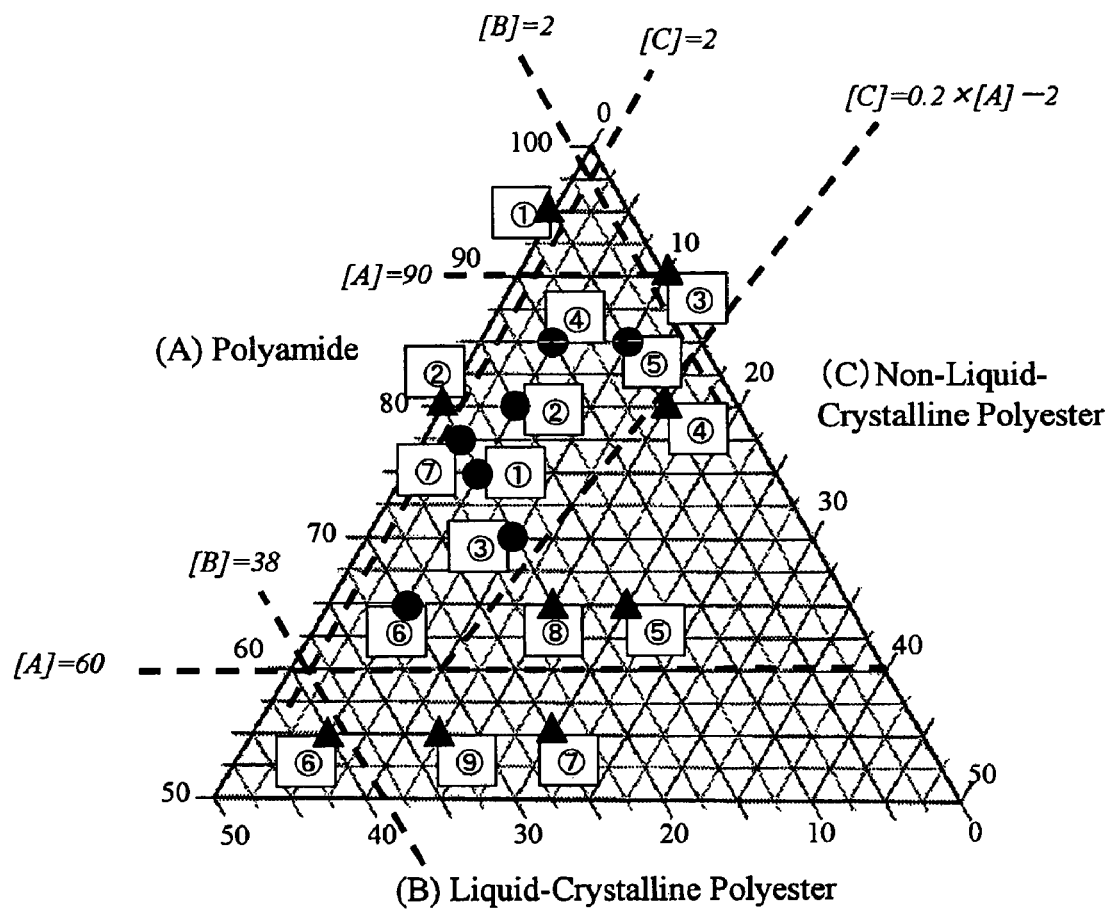
FIG. 1 is a diagram showing the composition range of each component in a resin composition of the present invention as well as the composition of Examples and Comparative Examples.

Hereinafter, the present invention will be described specifically.

Polyamide (A) used in the present invention is a polymer having an amide bond (—NHCO—) in the main chain. Examples of preferable polyamide (A) include polycaprolactam (polyamide 6), polytetramethylene adipamide (polyamide 46), polyhexamethylene adipamide (polyamide 66), polyhexamethylene cyclohexylamide (polyamide 6C), polyhexamethylene sebacamide (polyamide 610), polyhexamethylene dodecamide (polyamide 612), polyundecalactam (polyamide 11), polydodecalactam (polyamide 12), polyhexamethylene isophthalamide (polyamide 6I), polyhexamethylene terephthalamide (polyamide 6T), polynonanemethylene terephthalamide (polyamide 9T), polydodecamethylene terephthalamide (polyamide 12T), or a polyamide copolymer containing two or more of monomeric units of these polymers, or a mixture of these polymers and/or polyamide copolymers. Among others, polyamide (A) that is preferable for achieving the object of the present invention is polyamide 6, polyamide 66, polyamide 612, polyamide 6I, polyamide 6C, or a polyamide copolymer containing monomeric units of these polymers, or a mixture of these polymers and/or polyamide copolymers. More preferably, the polyamide (A) is, for example, polyamide 66 or a polyamide copolymer comprising one or more of monomeric units of polyamide 6, polyamide 612, polyamide 6C, and polyamide 6 I with a monomeric unit of polyamide 66.

The molecular weight of the polyamide (A) used in the present invention is not particularly limited. The relative viscosity ηr of the polyamide (A) measured at 23° C. using 98% sulfuric acid according to JIS K6920 is preferably from 1.5 to 6.0 from the viewpoint of tensile elongation. The relative viscosity ηr is more preferably from 2.0 to 4.5, even more preferably from 2.0 to 4.0.

Liquid-crystalline polyester (B) used in the present invention is polyester called a thermotropic liquid-crystalline polymer, and those known in the art can be used. Examples thereof include: thermotropic liquid-crystalline polyester comprising p-hydroxybenzoic acid, 1,2-ethanediol, and terephthalic acid as main monomeric units; thermotropic liquid-crystalline polyester comprising p-hydroxybenzoic acid and 2-hydroxy-6-naphthoic acid as main monomeric units; thermotropic liquid-crystalline polyester comprising p-hydroxybenzoic acid, 4,4'-dihydroxybiphenyl, and terephthalic acid as main monomeric units; and mixtures thereof. Among others, liquid-crystalline polyester (B) that is preferable for achieving the object of the present invention is preferably liquid-crystalline polyesters having a melting point Tmb in the range from 210° C. to 350° C., or a mixture thereof from the viewpoint of the heat resistance and processability of a resin composition. The melting point Tmb is more preferably in the range from 250° C. to 300° C. from the viewpoint of heat resistance. In this context, the melting point can be determined by differential scanning calorimetry (DSC). Specifically, a sample is measured using a differential scanning calorimeter under conditions of heating from room temperature at a rate of 20° C./minute. After measurement of an endothermic peak temperature (Tm1), the sample is kept at a temperature from 20° C. to 50° C. higher than Tm1 for 3 minutes. Subsequently, the sample is cooled to room temperature under conditions of cooling at a rate of 20° C./minute. Then, the sample is measured again under conditions of heating at a rate of 20° C./minute, and its endothermic peak is observed during the measurement. The melting point (Tmb) is defined as a temperature represented by the peak top thereof.

Examples of even more preferable liquid-crystalline polyester (B) include those comprising structural units (I) and (II) shown below.

[Formula 1]

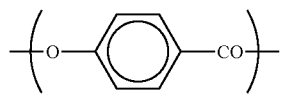

[Formula 2]

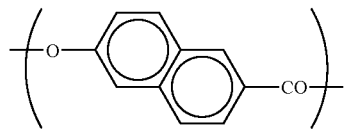

Herein, the structural units (I) and (II) are derived from p-hydroxybenzoic acid and 2-hydroxy-6-naphthoic acid, respectively.

The melt viscosity of the liquid-crystalline polyester (B) of the present invention is not particularly limited and is preferably from 0.5 to 200 Pa·s, more preferably from 1 to 100 Pa·s. The melt viscosity can be measured using a capillary rheometer. Specifically, the melt viscosity is defined as shear viscosity measured using a capillary rheometer under shear rate conditions of 1000 (1/second) at a temperature 50° C. higher than the melting point.

The liquid-crystalline polyester (B) used in the present invention may optionally contain a structural unit derived from other aromatic dicarboxylic acids, aromatic diols, and aromatic hydroxycarboxylic acids without impairing the characteristics and effects of the present invention.

Non-liquid-crystalline polyester (C) used in the present invention is thermoplastic polyester having an aromatic ring, and those known in the art can be used. Examples of preferable non-liquid-crystalline polyester (C) include copolymers that are composed mainly of aromatic dicarboxylic acid (or an ester derivative thereof) and diol (or an ester derivative thereof) and obtained through condensation reaction.

Examples of the aromatic dicarboxylic acid include terephthalic acid, isophthalic acid, phthalic acid, 2,6-naphthalenedicarboxylic acid, 2,7-naphthalenedicarboxylic acid, 1,5-naphthalenedicarboxylic acid, bis(p-carboxyphenyl)methane, anthracenedicarboxylic acid, 4,4'-diphenyldicarboxylic acid, 4,4'-diphenyletherdicarboxylic acid, and 1,2-bis(p-carboxyphenoxy)ethane. In this context, the aromatic dicarboxylic acid may be used in combination with 30% by mol or less of aliphatic dicarboxylic acid such as adipic acid, sebacic acid, azelaic acid, dodecanedioic acid, or dimer acid or alicyclic dicarboxylic acid such as 1,4-cyclohexanedicarboxylic acid or 1,3-cyclohexanedicarboxylic acid based on the whole amount of the dicarboxylic acid.

Moreover, Examples of the diol component include, but not limited to, aliphatic diol having 2 to 10 carbon atoms, specifically, ethylene glycol, propylene glycol, butylene glycol, 1,5-pentane glycol, decamethylene glycol, 3-methyl-1,3-propenediol, neopentyl glycol, cyclohexanedimethanol, and cyclohexanediol.

Specific examples of preferable polyester include: polyester homopolymers such as polyethylene terephthalate, polytrimethylene terephthalate, polybutylene terephthalate, polyethylene-1,2-bis(phenoxy)ethane-4,4'-dicarboxylate, polyethylene-2,6-naphthalate, and poly-1,4-cyclohexanedimethylene terephthalate; and polyester copolymers such as poly(ethylene terephthalate/ethylene isophthalate), poly(butylene terephthalate/butylene isophthalate), poly(butylene terephthalate/butylene sebacate), poly(butylene terephthalate/butylene decanedicarboxylate), and poly(1,4-cyclohexanedimethylene terephthalate/1,4-cyclohexanedimethylene isophthalate). Among them, more preferable polyester includes polyethylene terephthalate, polytrimethylene terephthalate, and polybutylene terephthalate. Polybutylene terephthalate is most preferable.

The composition of the polyamide (A), the liquid-crystalline polyester (B), and the non-liquid-crystalline polyester (C) for obtaining a polyamide composition of the present invention falls within the range wherein parts by mass (Ma) of the polyamide (A), parts by mass (Mb) of the liquid-crystalline polyester (B), and parts by mass (Mc) of the non-liquid-crystalline polyester (C), in case that total of the polyamide (A), the liquid-crystalline polyester (B), and the non-liquid-crystalline polyester (C) is 100 parts by mass, satisfy all the following three formulas:

$$60 \leq Ma \leq 90,$$

$$2 \leq Mb \leq 38, \text{ and}$$

$$2 \leq Mc \leq Ma \times 0.2 - 2.$$

When the parts by mass of each component falls within this range, the resulting polyamide composition is excellent in a balance among the physical properties of tensile elongation, water absorbency, and heat resistance. The parts by mass (Ma) of the polyamide (A) are preferably in the range of $70 \leq Ma \leq 88$ from the viewpoint of tensile elongation and water absorbency. The parts by mass (Mb) of the liquid-crystalline polyester (B) are preferably in the range of $5 \leq Mb \leq 20$, more preferably in the range of $10 \leq Mb \leq 20$, from the viewpoint of tensile elongation. The parts by mass (Mc) of the non-liquid-crystalline polyester (C) are preferably in the range of $2 \leq Mc \leq 10$, more preferably in the range of $3 \leq Mc \leq 8$. Furthermore, a ratio between the parts by mass (Mb) of the liquid-crystalline polyester (B) and the parts by mass (Mc) of the non-liquid-crystalline polyester (C) is preferably $1 \leq Mb/Mc \leq 7$ from the viewpoint of water absorbency.

A general method for determining the amount of each component in a composition is a method whereby each component is separated and measured for its mass to determine the proportion of the mass to the whole mass or a method whereby each mass is determined by quantitative analysis using an analyzer. Examples of such analysis using an analyzer include quantification by nuclear magnetic resonance spectrometry and the quantification of constituent monomers by pyrolysis chromatography/mass spectrometry. Alternatively, these methods may be combined for analysis. In the present invention, specifically, the composition can be separated into a component soluble in hexafluoroisopropanol (soluble part) and a component insoluble in hexafluoroisopropanol (insoluble part) for analysis. The amount of each component in the composition can be determined from the ratio between the polyamide (A) and the non-liquid-crystalline polyester (C) calculated from the $^1$H-NMR measurement of the soluble part and from the ratio by weight of the liquid-crystalline polyester (B) determined by the weighing of the insoluble part.

The polyamide composition of the present invention can be produced by adjusting the amount of each component formulated to fall within the composition range of the present invention.

The polyamide composition of the present invention can be produced by melt-kneading. A kneading machine generally in practical use can be applied as an apparatus for performing melt-kneading. For example, a single-screw or multi-screw kneading extruder, a Banbury mixer, and a roll are used. A method for melt-kneading may be any of a method whereby all the components are simultaneously kneaded, a method whereby a preliminarily kneaded blend is kneaded, and a method whereby the components are fed one by one into an extruder during kneading. A kneading temperature is preferably a temperature from 1° C. to 100° C. higher, more preferably from 10° C. to 60° C. higher, most preferably from 20° C. to 50° C. higher than the highest melting point or softening point among those of the polyamide (A), the liquid-crystalline polyester (B), and the non-liquid-crystalline polyester (C). Specifically, in the present invention, it is preferred that all the resins should be melted and mixed to produce the polyamide composition of the present invention. The melting point or softening point can be determined by differential scanning calorimetry (DSC) according to JIS K7121. The temperature range described above is preferable from the viewpoint of tensile elongation and productivity.

The polyamide composition of the present invention may optionally be supplemented with various additives routinely used without impairing the object of the present invention. For example, a filler, a flame retardant, a pigment, a coloring agent, a heat stabilizer, a lubricant, a plasticizer, and an antistatic agent can be added thereto.

Specific examples of the filler include inorganic fibers such as glass fibers and carbon fibers, and inorganic fillers such as mica, talc, clay minerals, alumina, silica, and apatite.

Specific examples of the flame retardant include aluminum hydroxide, magnesium hydroxide, zinc borate, zinc stannate, zinc hydroxystannate, ammonium polyphosphate, melamine cyanurate, succinoguanamine, melamine polyphosphate, melamine sulfate, melamine phthalate, and aluminum phosphate.

Specific examples of the pigment include titanium white and carbon black.

Specific examples of the heat stabilizer include phosphorous acid metal salts (e.g., sodium hypophosphite), hindered phenol, and hindered amine. Specific examples of the lubricant include higher fatty acid metal salts, higher fatty acid amide, and higher fatty acid ester.

EXAMPLES

Hereinafter, the present invention will be described more specifically with reference to Examples. However, the present invention is not intended to be limited to Examples below. In this context, physical properties described in Examples and Comparative Examples below were evaluated as follows:

[Evaluation Method 1] Relative Viscosity of Polyamide (A)

The relative viscosity was measured at 23° C. using 98% sulfuric acid according to JIS K6920.

[Evaluation Method 2] Melting Point of Liquid-Crystalline Polyester (B)

The melting point was measured using a differential scanning calorimeter DSC-7 manufactured by Perkin Elmer Co., Ltd. under conditions of heating and cooling at a rate of ±20° C./minute. Approximately 10 mg of a sample was heated from room temperature. After observation of an endothermic peak temperature (Tm1), the sample was kept at 300° C. in Production Example 1, at 350° C. in Production Example 2, and at 250° C. in Production Example 3 for 3 minutes. Subsequently, the sample was cooled to room temperature. Then, the sample was heated again, and its endothermic peak was observed. A temperature represented by the peak top thereof was used as the melting point (Tmb).

[Evaluation Method 3] Melt Viscosity of Liquid-Crystalline Polyester (B)

A twin-capillary rheometer RH7-2 manufactured by Rosand Precision Ltd. was used. A measurement temperature was a temperature 50° C. higher than the melting point. The capillaries used were 1 mm in diameter and 16 mm in length on the measurement side and 1 mm in diameter and 0.25 mm in length on the reference side. The measurement was performed under shear rate conditions of 1000 (1/second). The obtained shear viscosity was used as the melt viscosity.

[Evaluation Method 4] Tensile Properties

An ASTM No. 1 test piece of 3 mm in thickness was obtained using an injection molding machine (PS-40E manufactured by Nissei Plastic Industrial Co., Ltd.) at a cylinder temperature set to 280° C. and a mold temperature set to 80° C. under injection molding conditions of injection for 14 seconds and cooling for 16 seconds. Tensile strength and tensile elongation were measured according to ASTM D638.

[Evaluation Method 5] Deflection Temperature Under Load (DTUL)

A test piece of 3.2 mm in thickness×127 mm in length×12.7 mm in width was obtained by molding in the same way as in the Evaluation method 3. Deflection temperature under load was measured under load of 1.82 MPa using a full-automatic HDT (Heat Deflection Temperature) tester (6A-2 manufactured by Toyo Seiki Seisaku-Sho, Ltd.).

[Evaluation Method 6] Water Absorption

A test piece obtained by molding in the same way as in the Evaluation method 3 was immersed in water at 23° C. for 24 hours. Water absorption was determined from the increment in mass.

Resins used in Examples and Comparative Examples are shown below.

Polyamide (A)

PA-1: polyamide 66
  Leona 1400 manufactured by Asahi Kasei Chemicals Corp., ηr=2.75

PA-2: polyamide 66
  Leona 1200 manufactured by Asahi Kasei Chemicals Corp., ηr=2.57

PA-3: polyamide 6/66
Leona 9200 manufactured by Asahi Kasei Chemicals Corp., ηr=2.55
PA-4: polyamide 612
polyamide produced in Production Example 1, ηr=2.50
PA-5: polyamide 66/6I
polyamide produced in Production Example 2, ηr=2.55
PA-6: polyamide 6/66/6I
polyamide produced in Production Example 3, ηr=2.53
PA-7: polyamide 66/6C
polyamide produced in Production Example 4, ηr=2.50
PA-8: polyamide 66/6I/6C
polyamide produced in Production Example 5, ηr=2.51
Liquid-Crystalline Polyester (B)
LCP-1: liquid-crystalline polyester produced in Production Example 6, melt viscosity=25 Pa·s
LCP-2: liquid-crystalline polyester produced in Production Example 7, melt viscosity=15 Pa·s
LCP-3: liquid-crystalline polyester produced in Production Example 8, melt viscosity=49 Pa·s
Non-Liquid-Crystalline Polyester (C)
polyethylene terephthalate (PET): NEH-2050 manufactured by UNITIKA.LTD.
polybutylene terephthalate (PBT): DURANEX 2002 manufactured by Polyplastics Co., Ltd.

Production Example 1

Production Example of Polyamide PA-4

2.00 kg of an equimolar salt of dodecanedioic acid and hexamethylenediamine and 2.5 kg of pure water were placed in a 5-L autoclave and well stirred. The atmosphere within the autoclave was substituted with nitrogen five times. Then, the mixture was stirred, while the temperature in the autoclave was raised from room temperature to 220° C. over approximately 1 hour. The gage pressure in the autoclave was increased to 1.8 MPa by this heating. In this state, water vapor was gradually removed, and heating was continued with the pressure kept at 1.8 MPa. After additional two hours, heating was stopped when the temperature within the autoclave reached 260° C. The discharge valve of the autoclave was closed, and the mixture was cooled to room temperature over approximately 8 hours. After cooling, the autoclave was opened, and approximately 2 kg of a polymer was taken out thereof and pulverized. The obtained pulverized polymer powder was placed in a 10-L evaporator and solid-phase polymerized at 200° C. for 10 hours under nitrogen stream.

Production Example 2

Production Example of Polyamide PA-5

2.00 kg of an equimolar salt of adipic acid and hexamethylenediamine, 0.50 kg of an equimolar salt of isophthalic acid and hexamethylenediamine, 0.10 kg of adipic acid, and 2.5 kg of pure water were placed in a 5-L autoclave and well stirred. The atmosphere within the autoclave was substituted with nitrogen five times. Then, the mixture was stirred, while the temperature in the autoclave was raised from room temperature to 220° C. over approximately 1 hour. The gage pressure in the autoclave was increased to 1.8 MPa by this heating. In this state, water vapor was gradually removed, and heating was continued with the pressure kept at 1.8 MPa. After additional two hours, heating was stopped when the temperature within the autoclave reached 260° C. The discharge valve of the autoclave was closed, and the mixture was cooled to room temperature over approximately 8 hours. After cooling, the autoclave was opened, and approximately 2 kg of a polymer was taken out thereof and pulverized. The obtained pulverized polymer powder was placed in a 10-L evaporator and solid-phase polymerized at 200° C. for 10 hours under nitrogen stream. The polyamide (A) thus obtained by solid-phase polymerization contained 18.8% by mol of a hexamethylene isophthalamide unit.

Production Example 3

Production Example of Polyamide (A) PA-6

1.90 kg of an equimolar salt of adipic acid and hexamethylenediamine, 0.40 kg of an equimolar salt of isophthalic acid and hexamethylenediamine, 0.2 kg of ε-caprolactam, 0.10 kg of adipic acid, and 2.5 kg of pure water were placed in a 5-L autoclave and well stirred. The atmosphere within the autoclave was substituted with nitrogen five times. Then, the mixture was stirred, while the temperature in the autoclave was raised from room temperature to 220° C. over approximately 1 hour. The gage pressure in the autoclave was increased to 1.8 MPa by this heating. In this state, water vapor was gradually removed, and heating was continued with the pressure kept at 1.8 MPa. After additional two hours, heating was stopped when the temperature within the autoclave reached 260° C. The discharge valve of the autoclave was closed, and the mixture was cooled to room temperature over approximately 8 hours. After cooling, the autoclave was opened, and approximately 2 kg of a polymer was taken out thereof and pulverized. The obtained pulverized polymer powder was placed in a 10-L evaporator and solid-phase polymerized at 200° C. for 10 hours under nitrogen stream. The polyamide (A) thus obtained by solid-phase polymerization contained 15.0% by mol of a capramide unit and 14.0% by mol of a hexamethylene isophthalamide unit.

Production Example 4

Production Example of Polyamide (A) PA-7

0.95 kg of an equimolar salt of adipic acid and hexamethylenediamine, 1.05 kg of an equimolar salt of 1,4-cyclohexanedicarboxylic acid having a trans/cis molar ratio of 80/20 and hexamethylenediamine, and 2.5 kg of pure water were placed in a 5-L autoclave and well stirred. The atmosphere within the autoclave was substituted with nitrogen five times. Then, the mixture was stirred, while the temperature in the autoclave was raised from room temperature to 220° C. over approximately 1 hour. The gage pressure in the autoclave was increased to 2.2 MPa by this heating. In this state, water vapor was gradually removed, and heating was continued with the pressure kept at 2.2 MPa. After additional one hour, heating was stopped when the temperature within the autoclave reached 253° C. The discharge valve of the autoclave was closed, and the mixture was cooled to room temperature over approximately 8 hours. After cooling, the autoclave was opened, and approximately 2 kg of a polymer was taken out thereof and pulverized. The obtained pulverized polymer powder was placed in a 10-L evaporator and solid-phase polymerized at 200° C. for 10 hours under nitrogen stream. The polyamide (A) thus obtained by solid-phase polymerization contained 50.0% by mol of a hexamethylene cyclohexylamide unit.

Production Example 5

Production Example of Polyamide (A) PA-8

1.43 kg of an equimolar salt of adipic acid and hexamethylenediamine, 0.28 kg of an equimolar salt of 1,4-cyclohexanedicarboxylic acid having a trans/cis molar ratio of 80/20 and hexamethylenediamine, 0.29 kg of an equimolar salt of isophthalic acid and hexamethylenediamine, and 2.5 kg of pure water were placed in a 5-L autoclave and well stirred. The atmosphere within the autoclave was substituted with nitrogen five times. Then, the mixture was stirred, while the temperature in the autoclave was raised from room tempera ture to 220° C. over approximately 1 hour. The gage pressure in the autoclave was increased to 2.2 MPa by this heating. In this state, water vapor was gradually removed, and heating was continued with the pressure kept at 2.2 MPa. After additional one hour, heating was stopped when the temperature within the autoclave reached 253° C. The discharge valve of the autoclave was closed, and the mixture was cooled to room temperature over approximately 8 hours. After cooling, the autoclave was opened, and approximately 2 kg of a polymer was taken out thereof and pulverized. The obtained pulverized polymer powder was placed in a 10-L evaporator and solid-phase polymerized at 200° C. for 10 hours under nitrogen stream. The polyamide (A) thus obtained by solid-phase polymerization contained 13% by mol of a hexamethylene cyclohexylamide unit and 14% by mol of a hexamethylene isophthalamide unit.

Production Example 6

Production Example of Liquid-Crystalline Polyester (B) LCP-1 p-Hydroxybenzoic acid, 2-hydroxy-6-naphthoic acid, and acetic anhydride were melted by heating and polycondensed in a nitrogen atmosphere to obtain liquid-crystalline polyester LCP-1 represented by the theoretical structural formula shown below. The obtained liquid-crystalline polyester LCP-1 had a melting point of 280° C.

In this context, the ratio of components in the composition is indicated in molar ratio.

[Formula 3]

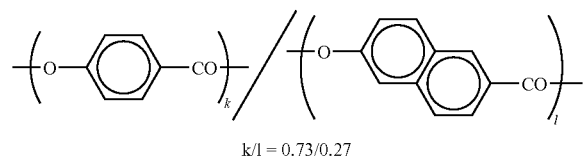

k/l = 0.73/0.27

Production Example 7

Production Example of Liquid-Crystalline Polyester (B) LCP-2 p-Hydroxybenzoic acid, 2-hydroxy-6-naphthoic acid, hydroquinone, 2,6-naphthalenedicarboxylic acid, and acetic anhydride were melted by heating and polycondensed in a nitrogen atmosphere to obtain liquid-crystalline polyester LCP-2 represented by the theoretical structural formula shown below. The obtained liquid-crystalline polyester LCP-2 had a melting point of 320° C. In this context, the ratio of components in the composition is indicated in molar ratio.

[Formula 4]

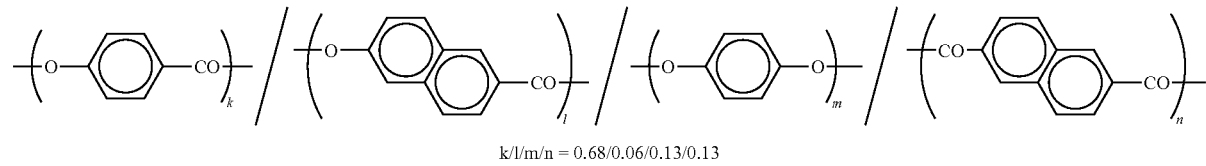

k/l/m/n = 0.68/0.06/0.13/0.13

Production Example 8

Production Example of Liquid-Crystalline Polyester (B)

p-Hydroxybenzoic acid, 2-hydroxy-6-naphthoic acid, hydroquinone, terephthalic acid, and acetic anhydride were melted by heating and polycondensed in a nitrogen atmosphere to obtain liquid-crystalline polyester LCP-3 represented by the theoretical structural formula shown below. The obtained liquid-crystalline polyester LCP-3 had a melting point of 220° C. In this context, the ratio of components in the composition is indicated in molar ratio.

[Formula 5]

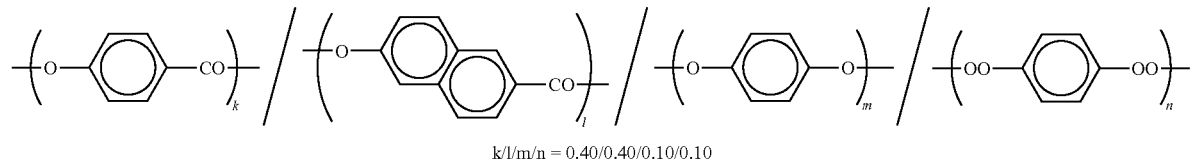

k/l/m/n = 0.40/0.40/0.10/0.10

Example 1

75 parts by mass of PA-1, 20 parts by mass of LCP-1, and 5 parts by mass of PBT were blended at these proportions to obtain a resin mixture. The resin mixture was melt-kneaded using a twin-screw extruder (TEM35 manufactured by Toshiba Machine Co., Ltd., co-rotating twin screw type, L/D=47.6 (D=37 mmφ)). The melt-kneaded mixture was extruded at a screw speed of 300 rpm, a cylinder temperature of 280° C., and an extrusion rate of 60 Kg/hr (residence time: 1 minute) without decompression. The polymer temperature around a nozzle at the end of the extruder was 290° C. The polymer was discharged in a strand form from the nozzle at the end, then water-cooled, and cut into a pellet. Results of evaluation performed according to the Evaluation Examples are shown in Table 1.

Examples 2 to 7

A pellet was obtained in the same way as in Example 1 except that PA-1, LCP-1, and PBT were blended at proportions shown in Table 1. Results of evaluation are shown in Table 1.

Comparative Example 1

95 parts by mass of PA-1 and 5 parts by mass of LCP-1 were blended at these proportions. The following procedures were performed in the same way as in Example 1 to obtain a pellet. Results of evaluation are shown in Table 1.

Comparative Examples 2 to 9

A pellet was obtained in the same way as in Example 1 except that PA-1, LCP-1, and PBT were blended at proportions shown in Table 1. Results of evaluation are shown in Table 1.

TABLE 1

| Item | | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|---|---|---|---|---|---|---|
| Composition of resin | (A) Type | | | | | | | | PA-1 | | | | | | | | |
| | Part by mass | 75 | 80 | 70 | 86 | 85 | 65 | 77 | 95 | 80 | 90 | 80 | 65 | 65 | 55 | 65 | 55 |
| | (B) Type | | | | | | | | LCP-1 | | | | | | | | |
| | Part by mass | 20 | 15 | 20 | 10 | 5 | 30 | 20 | 5 | 20 | — | 5 | 15 | 40 | 25 | 22.5 | 32.5 |
| | (C) Type | | | | | | | | PBT | | | | | | | | |
| | Part by mass | 5 | 5 | 10 | 5 | 10 | 5 | 3 | — | — | 10 | 15 | 20 | 5 | 20 | 12.5 | 12.5 |
| Tensile strength (MPa) | | 81 | 82 | 79 | 82 | 81 | 79 | 82 | 87 | 84 | 87 | 80 | 75 | 98 | 77 | 76 | 88 |
| Tensile elongation (%) | | 22 | 21 | 17 | 18 | 17 | 15 | 20 | 24 | 12 | 13 | 12 | 10 | 9 | 7 | 11 | 9 |
| DTUL (at 1.8 MPa, °C.) | | 76 | 76 | 77 | 74 | 74 | 77 | 79 | 77 | 80 | 81 | 74 | 80 | 86 | 81 | 76 | 84 |
| Water absorption (%) | | 0.64 | 0.72 | 0.60 | 0.76 | 0.79 | 0.54 | 0.66 | 0.98 | 0.70 | 0.96 | 0.74 | 0.71 | 0.50 | 0.57 | 0.60 | 0.54 |

The composition range of each component in the resin composition of the present invention as well as the composition of Examples and Comparative Examples shown in Table 1 is shown in FIG. 1. As can be seen from the results shown in FIG. 1 and Table 1, the resin composition of the present invention is excellent in heat resistance and tensile elongation and also excellent in a balance between these properties within the composition range of each component.

Example 8

A pellet was obtained in the same way as in Example 1 except that 75 parts by mass of PA-1, 20 parts by mass of LCP-1, and 5 parts by mass of PET were blended at these proportions. Results of evaluation are shown in Table 2.

Comparative Example 10

A pellet was obtained in the same way as in Example 1 except that 55 parts by mass of PA-1, 20 parts by mass of LCP-1, and 25 parts by mass of PET were blended at these proportions. Results of evaluation are shown in Table 2.

Comparative Example 11

40 parts by mass of PA-1, 20 parts by mass of LCP-1, and 40 parts by mass of PET were blended at these proportions. The following procedures were performed in the same way as in Example 1. However, a pellet could not be obtained due to poor extrudability.

Example 9

A pellet was obtained in the same way as in Example 1 except that LCP-2 was used instead of LCP-1, and a cylinder temperature was set to 320° C. Results of evaluation are shown in Table 2.

Example 10

A pellet was obtained in the same way as in Example 1 except that LCP-3 was used instead of LCP-1. Results of evaluation are shown in Table 2.

Example 11

A pellet was obtained in the same way as in Example 1 except that PA-2 was used instead of PA-1. Results of evaluation are shown in Table 2.

Examples 12 to 14

A pellet was obtained in the same way as in Example 1 except that polyamide (A) shown in Type in Table 2 was used instead of PA-1. Results of evaluation are shown in Table 2.

Example 15

A pellet was obtained in the same way as in Example 1 except that PA-6 was used instead of PA-1, and a cylinder temperature was set to 320° C. Results of evaluation are shown in Table 2.

Examples 16 and 17

A pellet was obtained in the same way as in Example 1 except that polyamide (A) shown in Type in Table 2 was used instead of PA-1. Results of evaluation are shown in Table 2.

TABLE 2

| Item | | Ex. 8 | Com. Ex. 10 | Com. Ex. 11 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|
| Composition of resin | (A) Type | | | PA-1 | | | PA-2 | PA-3 | PA-4 | PA-5 | PA-6 | PA-7 | PA-8 |
| | Part by mass | 75 | 55 | 40 | 75 | 75 | 75 | 75 | 75 | 75 | 75 | 75 | 75 |
| | (B) Type | | LCP-1 | | LCP-2 | LCP-3 | | | | LCP-1 | | | |
| | Part by mass | 20 | 20 | 20 | 20 | 20 | 20 | 20 | 20 | 20 | 20 | 20 | 20 |
| | (C) Type | | PET | | | | | | PBT | | | | |
| | Part by mass | 5 | 25 | 40 | 5 | 5 | 5 | 5 | 5 | 5 | 5 | 5 | 5 |
| Tensile strength (MPa) | | 82 | 80 | Poor extrudability | 80 | 79 | 79 | 80 | 78 | 81 | 79 | 81 | 82 |
| Tensile elongation (%) | | 16 | 6 | | 16 | 18 | 17 | 16 | 15 | 15 | 16 | 15 | 17 |
| DTUL (at 1.8 MPa, °C.) | | 78 | 76 | | 80 | 74 | 75 | 77 | 74 | 76 | 75 | 86 | 80 |
| Water absorption (%) | | 0.60 | 0.47 | | 0.68 | 0.72 | 0.71 | 0.75 | 0.65 | 0.73 | 0.73 | 0.69 | 0.71 |

INDUSTRIAL APPLICABILITY

A polyamide composition of the present invention is excellent in heat resistance and tensile elongation and also excellent in a balance between these properties. Therefore, the polyamide composition of the present invention is useful as various industrial materials such as machinery parts and electrical/electronic parts.

The invention claimed is:

1. A polyamide composition comprising a polyamide, a liquid-crystalline polyester, and a non-liquid-crystalline polyester,
wherein parts by mass (Ma) of the polyamide, parts by mass (Mb) of the liquid-crystalline polyester, and parts by mass (Mc) of the non-liquid-crystalline polyester, in case that total of the polyamide, the liquid-crystalline polyester, and the non-liquid-crystalline polyester is 100 parts by mass, satisfy the following formulas:

$60 \leq Ma \leq 90$, $2 \leq Mb \leq 38$, and $2 \leq Mc \leq Ma \times 0.2 - 2$.

2. The polyamide composition according to claim 1, wherein a ratio between the parts by mass (Mb) of the liquid-crystalline polyester and the parts by mass (Mc) of the non-liquid-crystalline polyester satisfies the following formula:

$1 \leq Mb/Mc \leq 7$.

3. The polyamide composition according to claim 1, wherein the liquid-crystalline polyester has a melting point (Tmb) from 210° C. to 350° C.

4. The polyamide composition according to claim 1, wherein the non-liquid-crystalline polyester is selected from at least one or more of polyethylene terephthalate, polytrimethylene terephthalate, and polybutylene terephthalate.

5. The polyamide composition according to claim 1, wherein the polyamide is polyamide 6, polyamide 66, polyamide 612, polyamide 6I, polyamide 6C, or a polyamide copolymer containing two or more of monomeric units of these polymers, or a mixture of these polymers and/or polyamide copolymers.

6. The polyamide composition according to claim 1, wherein the parts by mass (Ma) of the polyamide satisfy the following formula:

$70 \leq Ma \leq 88$.

7. The polyamide composition according to claim 1, wherein the parts by mass (Mb) of the liquid-crystalline polyester satisfy the following formula:

$5 \leq Mb \leq 20$.

8. The polyamide composition according to claim 1, wherein the parts by mass (Mc) of the non-liquid-crystalline polyester satisfy the following formula:

$2 \leq Mc \leq 10$.

* * * * *